(12) United States Patent
Copeland et al.

(10) Patent No.: US 7,673,351 B2
(45) Date of Patent: Mar. 9, 2010

(54) SHOCK ABSORBING STRUCTURE

(75) Inventors: Steve Copeland, Barrie (CA); Robert L. Weckman, Whitby (CA); Hyo-Chul Lee, Mississauga (CA)

(73) Assignee: Paradox Design Services Inc., Barrie, Ontario (CA)

( * ) Notice: Subject to any disclaimer, the term of this patent is extended or adjusted under 35 U.S.C. 154(b) by 585 days.

(21) Appl. No.: 11/244,561

(22) Filed: Oct. 6, 2005

(65) Prior Publication Data
US 2006/0070171 A1    Apr. 6, 2006

Related U.S. Application Data

(60) Provisional application No. 60/616,386, filed on Oct. 6, 2004.

(51) Int. Cl.
*A63B 71/10* (2006.01)
(52) U.S. Cl. ......................................................... 2/425
(58) Field of Classification Search ..................... 2/410, 2/411, 412, 414, 415, 420, 425, 417–419, 2/455
See application file for complete search history.

(56) References Cited

U.S. PATENT DOCUMENTS

| | | | | |
|---|---|---|---|---|
| 3,514,156 | A | * | 5/1970 | Fields .................... 297/452.45 |
| 3,806,950 | A | * | 4/1974 | Spencer-Foote ................. 2/413 |
| 3,872,511 | A | * | 3/1975 | Nichols .......................... 2/413 |
| 4,586,200 | A | | 5/1986 | Poon |
| 4,724,549 | A | | 2/1988 | Herder et al. |
| 4,845,786 | A | * | 7/1989 | Chiarella ........................ 2/412 |
| 5,168,576 | A | * | 12/1992 | Krent et al. ..................... 2/456 |
| 5,309,576 | A | * | 5/1994 | Broersma ....................... 2/412 |
| 5,518,802 | A | * | 5/1996 | Colvin et al. ................ 428/178 |
| 6,029,962 | A | | 2/2000 | Shorten et al. |
| 8,536,052 | | | 3/2003 | Tao et al. |

* cited by examiner

*Primary Examiner*—Tejash Patel
(74) *Attorney, Agent, or Firm*—Sand & Sebolt

(57) ABSTRACT

There is provided a shock absorbing structure comprising a generally planar surface made of a flexible plastic material. A plurality of upstanding, hollow support members extends from the planar surface. The support members are made of flexible plastic material. There is also a plurality of openings in each of the support members, the openings define air passages within the shock absorbing structure to allow air to flow through the support members. The shock absorbing structure may be used in helmets, shin pads, kneepads, elbow pads, shoulder pads, chest protectors, gloves, pants and footwear.

11 Claims, 10 Drawing Sheets

COOLING CURVES FOR HOCKEY HELMET WITH PROBE AT CENTER-LINE WITHIN PADDING

US 7,673,351 B2

SHOCK ABSORBING STRUCTURE

CROSS REFERENCE TO RELATED APPLICATIONS

This is a standard utility application claiming priority from U.S. Provisional Application Ser. No. 60/616,386, filed Oct. 6, 2004, the entire specification of which is incorporated herein by reference.

BACKGROUND OF THE INVENTION

1. Technical Field

The present invention relates to a shock absorbing structure. More particularly, the present invention relates to a shock absorber having a plurality of upstanding, hollow support members made of flexible plastic material. Specifically, the invention relates to a shock absorbing structure that assists in allowing air flow around the structure.

2. Background Information

Helmets and other protective equipment typically use foam for impact absorption, specifically, expanded polystyrene (EPS), polyethylene (EPP) or thermoplastic blown foam. These foams do not allow heat to dissipate from the head or body. Heat stress has become a major detriment to exercise performance in athletes, industrial workers and military personnel, often leading to severe heat stroke causing death. Some work has been done with plastic structures for impact absorption with limited success because of increased weight, increased thickness or high manufacturing costs.

The prior art discloses various structures used to absorb impacts. For example, U.S. Pat. No. 6,029,962 discloses an impact absorber that has pairs of semi-hemispherical indentations used as the impact absorber. U.S. Pat. No. 4,586,200 discloses a protective helmet that has inflatable air pockets, while U.S. Pat. No. 6,536,052 shows various shapes for an impact-absorbing layer that is made of textile.

U.S. Pat. No. 4,724,549 discloses a structure with air cells and passages between the air cells to allow air to flow between the liner and the head of the wearer. This patent contemplates having air flow within the protective layer.

There, therefore, remains a need to provide a shock absorbing structure that is lighter in weight than shock absorbing foam and that allows for air circulation within the structure for cooling purposes.

BRIEF SUMMARY OF THE INVENTION

The present invention provides a shock absorbing structure comprising: a generally planar surface made of a flexible plastic material; a plurality of upstanding, hollow support members extending from the planar surface, the support members made of flexible plastic material; and at least one opening in each of the support members defining an air passage within the shock absorbing structure to allow air to flow through the support members.

According to another aspect of the invention there is provided an accessory for providing protection to a part of the human body, the accessory comprising: a rigid outer protective shell defining an interior surface; a first layer of a shock absorbing material secured to the interior surface of the protective shell; and a removable porous second layer fitted on an interior surface of the first layer.

BRIEF DESCRIPTION OF THE SEVERAL VIEWS OF THE DRAWINGS

Preferred embodiments of the invention, illustrative of the best modes in which Applicant contemplates applying the principles, are set forth in the following description and are shown in the drawings and are particularly and distinctly pointed out and set forth in the appended claims.

Similar numbers refer to similar parts throughout the specification.

DETAILED DESCRIPTION OF THE INVENTION

Figure 1:
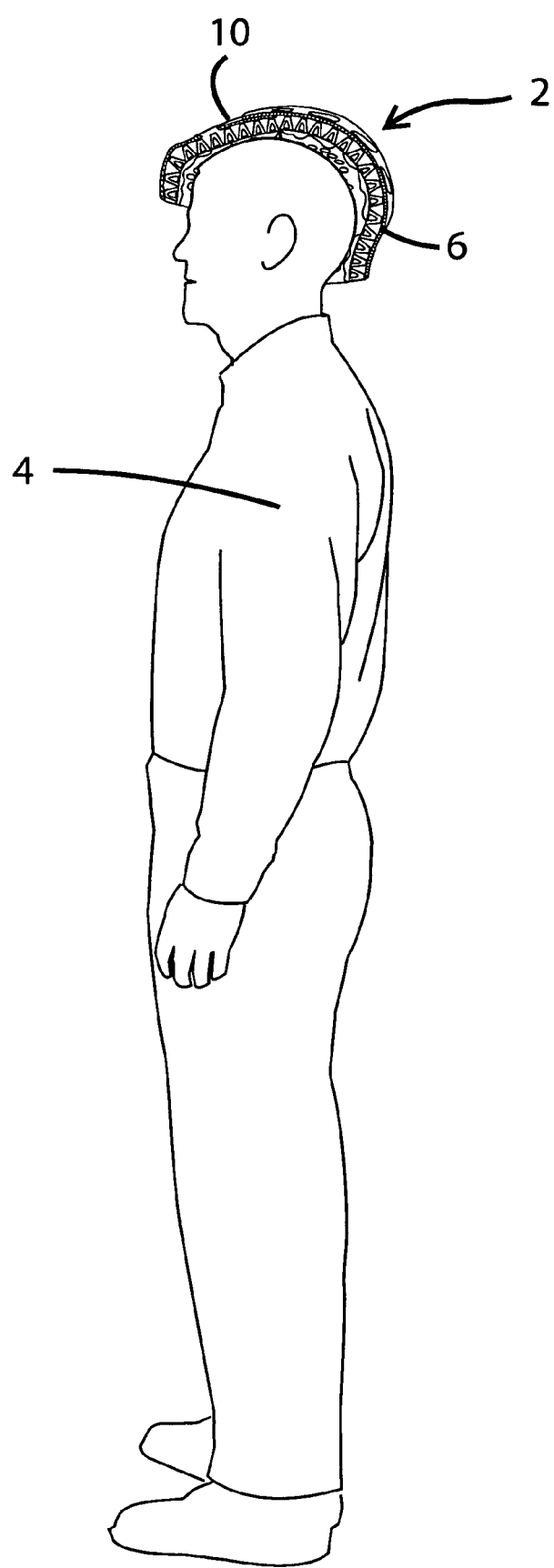
FIG. 1 is a side elevation view of a user wearing a helmet which includes the shock absorbing structure of the present invention.

A helmet 2 as is generally shown in FIG. 1 worn by a person 4. Helmet 2 is provided with a shock absorbing structure 10 of the present invention. Helmet 2 may have a hard exterior protective shell 6 and a chin strap (not shown) as will be more fully described herein below.

Figure 2:
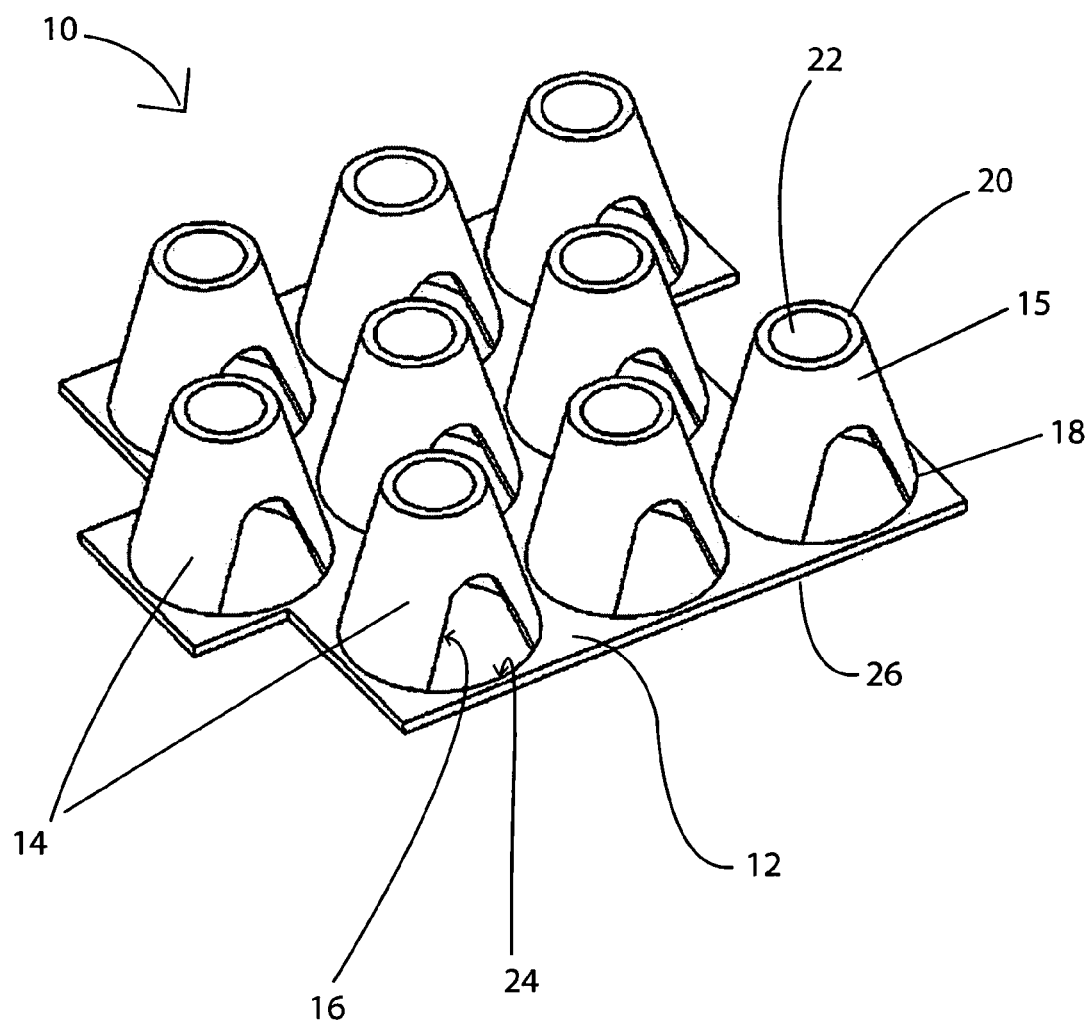
FIG. 2 is a perspective view of a first embodiment of the present invention.

FIG. 2 illustrates a first embodiment of the present invention. In accordance with one of the main features of the present invention, the shock absorbing structure 10 comprises a generally flat or planar surface 12 made of a suitable flexible plastic material. Disposed on the planar surface 12 are a plurality of upstanding, hollow support members 14 extending from the planar surface 12. Support members 14 include sidewalls 15 that are preferably made of the same flexible plastic material as the planar surface 12, and are integral with the planar surface 12. Each of the support members 14 include at least one opening 16 formed in sidewall 15 and that defines an air passage within the shock absorbing structure 10 to allow air to flow through the support members 14.

Preferably, the support members 14 have a shape that is generally frustoconical with the base 18 of the cone disposed on the planar surface 12, and the smaller end 20 of the cone being away from the planar surface 12. A second opening 22 is preferably located in the smaller end 20.

At the base 18 of the support members 14 is a surface opening 24 in the planar surface 12 that allows air to flow into the hollow support members 14 from the underside 26 of the planar surface 12. Opening 24 is generally positioned within support member 14.

The planar surface 12 and sidewalls 15 are made of a suitable flexible plastic material such as a thermoplastic polymer like polyethylene. As such, the planar surface 12 and support members 14 are able to flex when a force is applied to them.

Figure 3:
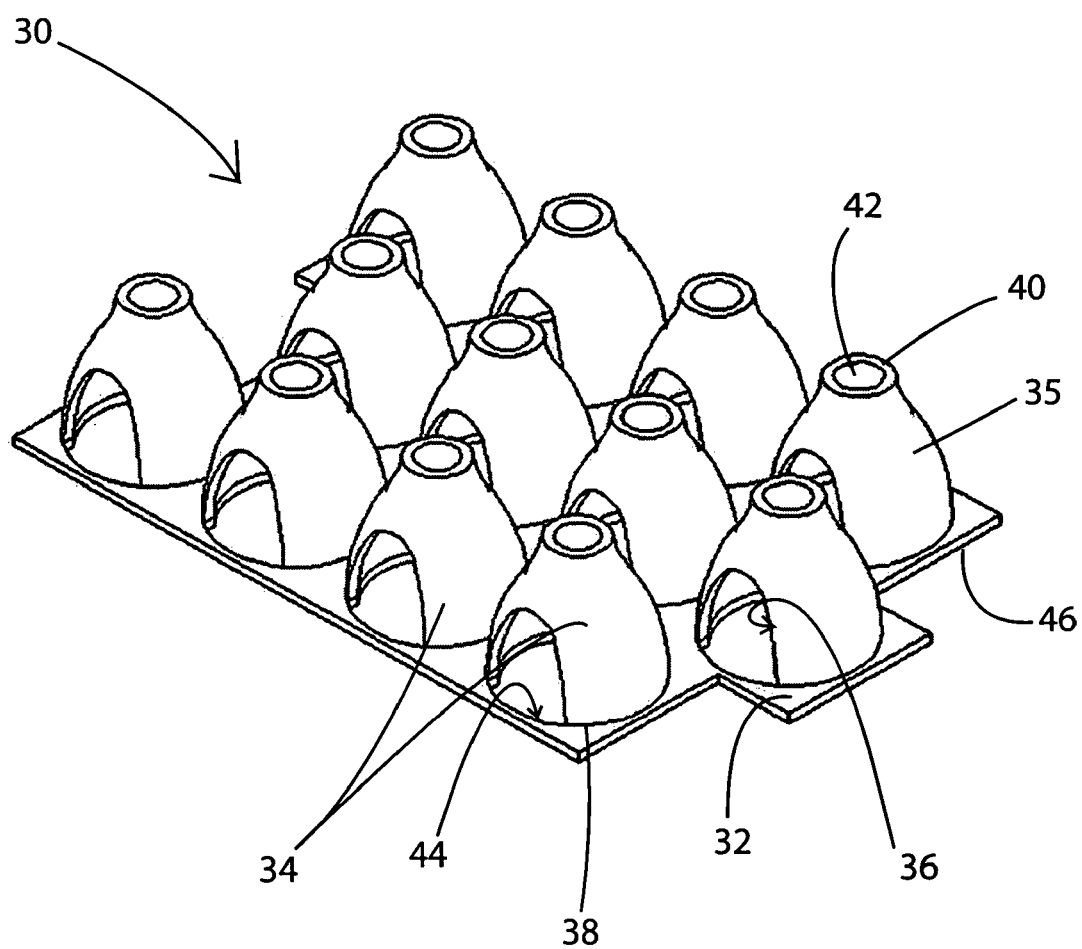
FIG. 3 is a perspective view of a second embodiment of the present invention.

FIG. 3 illustrates a second embodiment of the present invention. In this embodiment, the shock absorbing structure 30 comprises a generally planar surface 32 made of a suitable flexible plastic material. Disposed on the planar surface 32 are a plurality of upstanding, hollow support members 34 extending outwardly from the planar surface 32. Support members 34 include sidewalls 35 that are preferably made of the same flexible plastic material as the planar surface 32, and are integral with the planar surface 32. Each of the support members 34 includes at least one opening 36 that defines air passages within the shock absorbing structure 30 to allow air to flow through the support members 34.

Preferably, the support members 34 have a shape that is generally frustoconical with the sidewalls 35 being of a convex shape. The base 38 of the cone is disposed on the planar surface 32, and the smaller end 40 of the cone being away from the planar surface 32. A second opening 42 is preferably located in the smaller end 40. However, support member 34 may have a convex shape without departing from the spirit of the present invention.

At the base 38 of the support members 34 is a surface opening 44 in the planar surface 32 that allows air to flow into the hollow support members 34 from the underside 46 of the planar surface 32.

The planar surface 32 and convex sidewalls 35 are made of a suitable flexible plastic material such as a thermoplastic polymer like polyethylene. As such, the planar surface 32 and support members 34 are able to flex when a force is applied to them.

Figure 4:
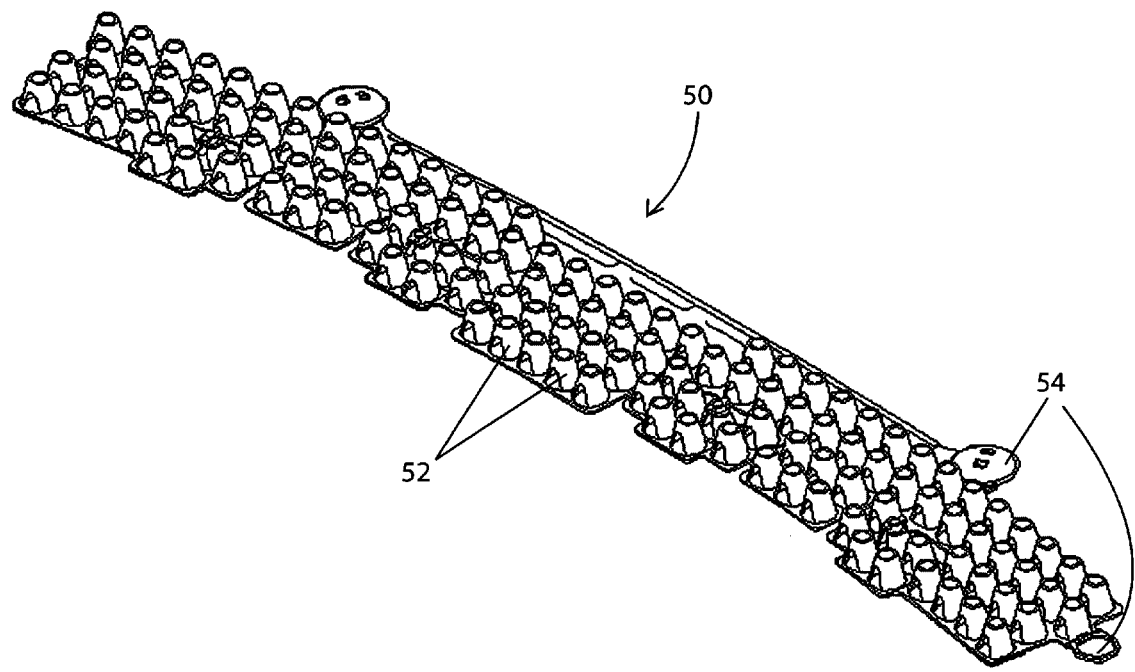
FIG. 4 is a perspective view of a band containing the first embodiment of the present invention.

In FIG. 4, a band 50 is shown that comprises a plurality of support members 52 disposed on the band 50. Support members 52 may take the form of support members 14 or 34 as previously described, each support member 52 having a plurality of openings therein to allow for airflow through band 50. Band 50 is configured to be inserted into a helmet or other protective device and may include fasteners 54 and other features typically used on bands that are used in this type of application.

Figure 5:
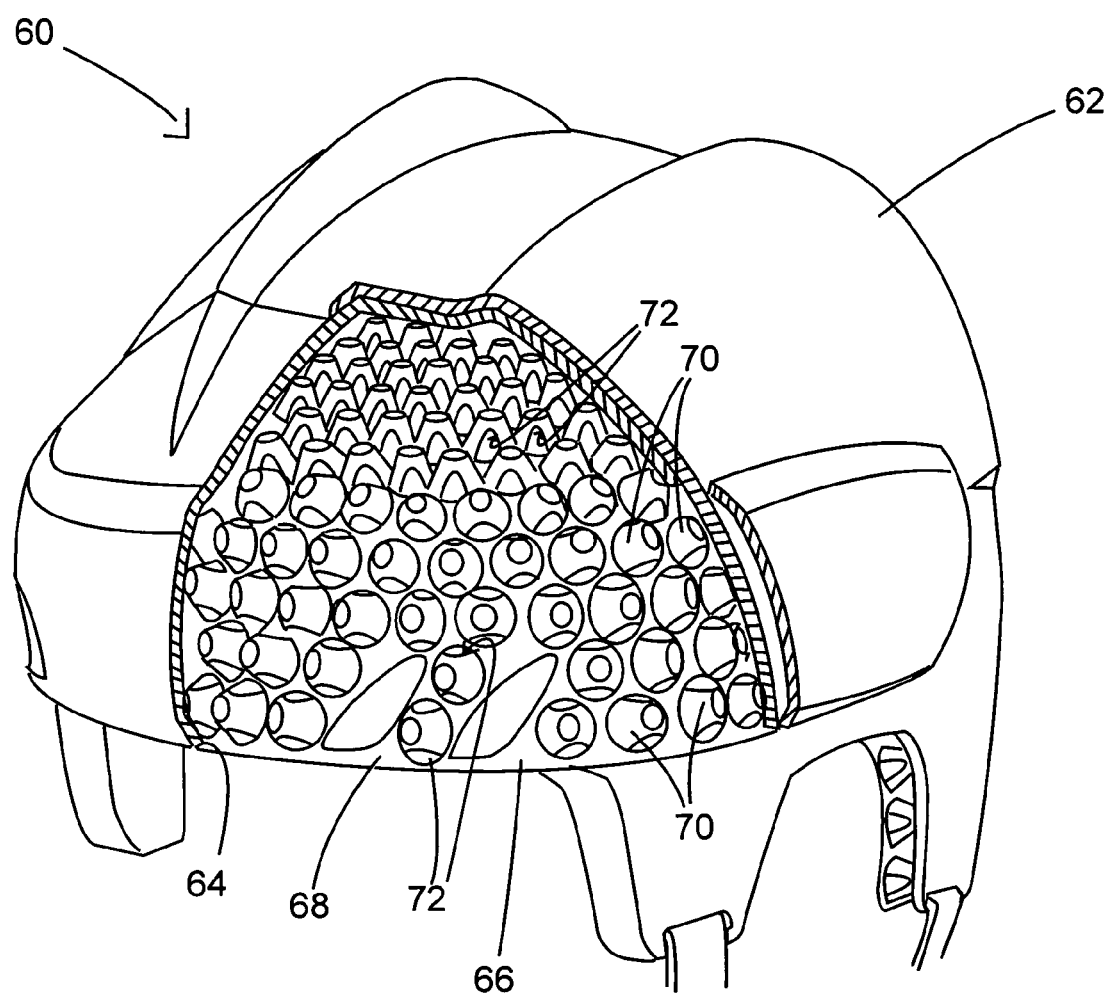
FIG. 5 is a partial, cut-away perspective view of a hockey helmet comprising an embodiment of the present invention.

The use of the preferred embodiments of the present invention in a helmet 60 is illustrated in FIG. 5. Helmet 60 is a typical accessory used for providing protection to a part of the human body, namely the head. Helmet 60 comprises a rigid outer protective shell 62 defining an interior surface 64. Shock absorbing structure 66 is secured to the interior surface 64 of the protective shell 62. Preferably, there is a removable porous second layer (not shown in FIG. 5) fitted on the interior surface of the structure 66.

The shock absorbing structure 66 is preferably one of the structures illustrated in FIGS. 2 and 3 and includes a generally planar surface 68 made of a flexible plastic material; a plurality of upstanding, hollow support members 70 extending from the planar surface 68; and a plurality of openings 72 in each of the support members defining air passages within the shock absorbing structure 68 to allow air to flow through the support members 70.

Figure 6:
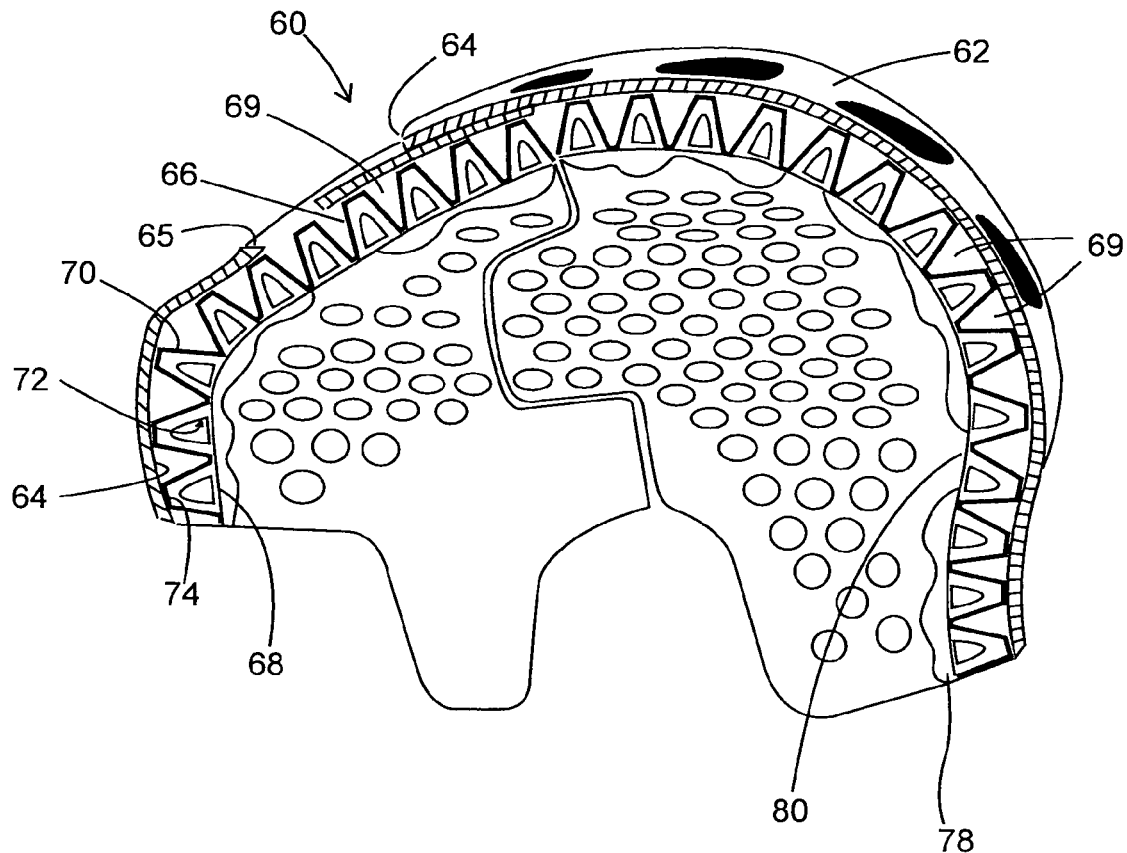
FIG. 6 is cross sectional view of the hockey helmet of FIG. 5.
Figure 6A:
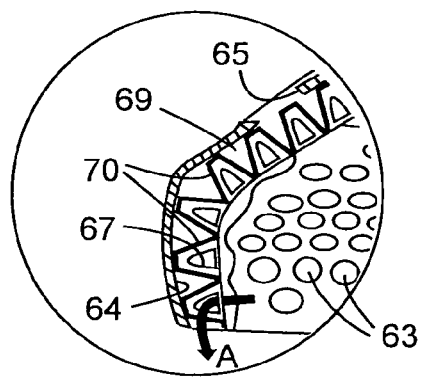
FIG. 6a is an enlarged view of a portion of the hockey helmet and shock absorbing structure showing a first possible type of air flow through the support members.
Figure 6B:
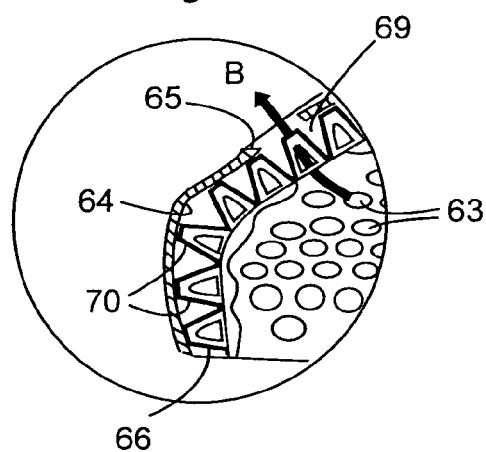
FIG. 6b is an enlarged view of a portion of the hockey helmet and shock absorbing structure showing a second possible type of air flow through the support members.

FIGS. 6-6b show the hockey helmet 60 in cross sectional view. The shock absorbing structure 66 is secured to the interior surface 64 of helmet 60 with the smaller ends 74 of the support members 66 disposed adjacent to the interior surface 64. The planar surface 68 of the structure 66 is consequently disposed farther away from the interior surface 64 than the smaller ends 74 of support member 66. Support members 66 may be of the type of support member 14, shown in FIG. 2 or support member 34 shown in FIG. 3. As seen in FIG. 6a, air may flow from an opening 63 in planar surface 68, into the interior of support member 66 and out through an opening 67 in the side thereof, as indicated by the Arrow "A" and into a flex air space 69 surrounding support member 66. Air may thereby flow from adjacent the athlete's head (not shown) through planar surface 68 and then through air spaces 69 between support members 66. Holes 65 may be provided in shell 62 to allow heated air to flow outwardly from helmet 60. Heated air from adjacent the athlete's head may also flow from openings 63 in planar member 68, through the interior of support members 66 and out through the small openings (not shown) in the top of support members 66 disposed adjacent interior surface 64 of shell 62. This path is depicted by Arrow B in FIG. 6b. If openings 65 are provided in shell 62, then the air may flow out of helmet 60.

Additional shock absorbing material 78 may be secured to the inside surface 80 of the structure 66 to provide more protection and/or more comfort for the user of the helmet 60.

Figure 7:
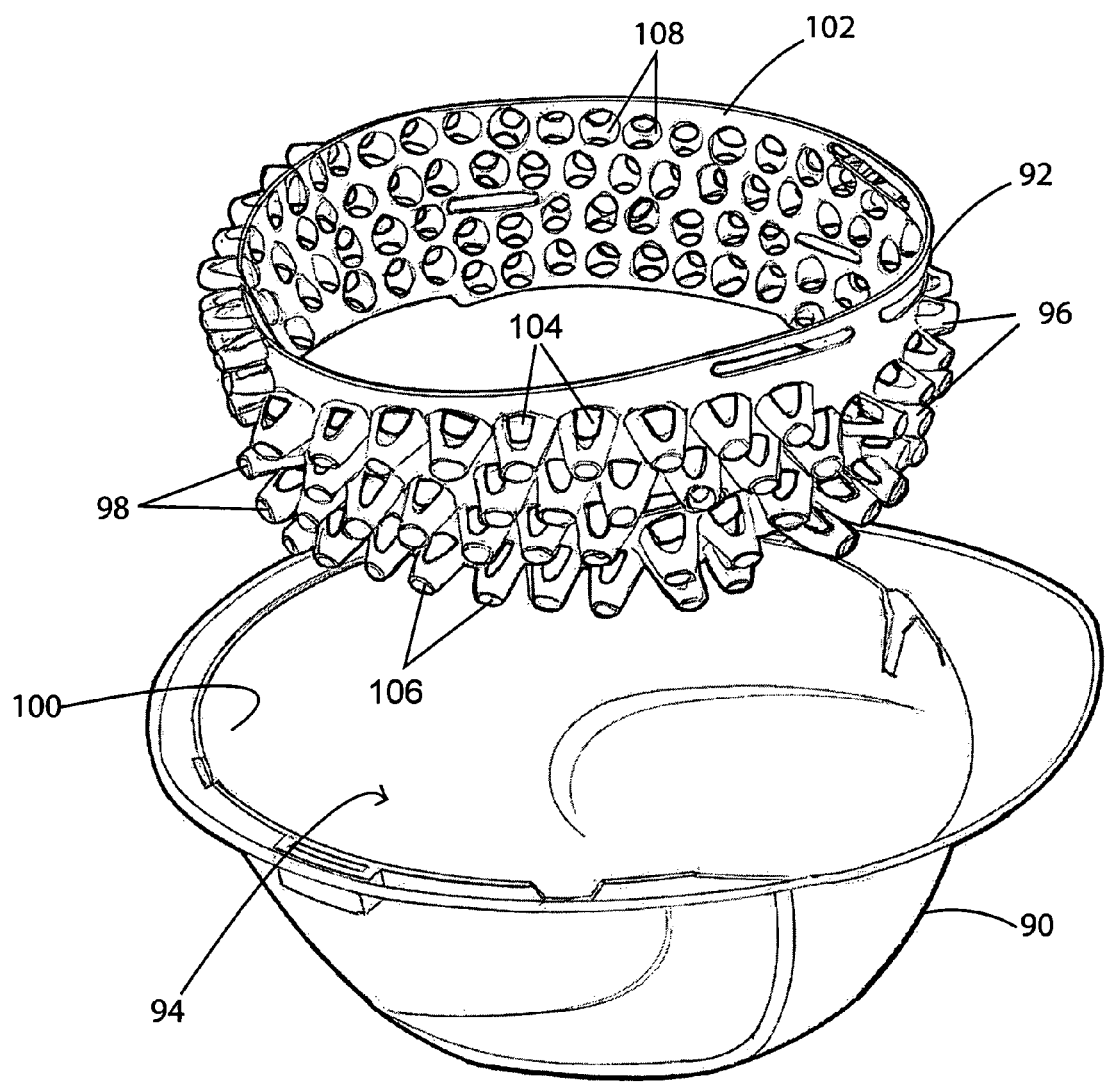
FIG. 7 is an exploded view of a construction helmet and a band containing the first embodiment of the present invention.

The preferred embodiments of the present invention may also be used in a construction helmet 90 as illustrated in FIG. 7. A band 92 of the preferred shock absorbing structure of the present invention is provided to fit into the inside 94 of the helmet 90. Suitable fasteners (not shown) are provided to secure the band 92 to the inside 94 of the helmet 90. Band 92 is similar to the band shown in FIG. 4 and comprises a plurality of support members 96 disposed on the band 90. The support members 96 are oriented so that their smaller ends 98 are adjacent to the inside surface 100 of the helmet 90. Thus, the underside of the planar surface 102 will be adjacent to the head of the wearer of the helmet 90.

There are various openings in the band 92: openings 104 in the support members 96, openings 106 in the smaller ends 98 and openings 108 in the planar surface 102. Openings 104, 106 and 108 allow air to flow within the band 92 thus providing a cooling effect to the wearer of the helmet 90.

The following example illustrates the various advantages of the preferred method of the present invention.

EXAMPLE 1

Figure 8:
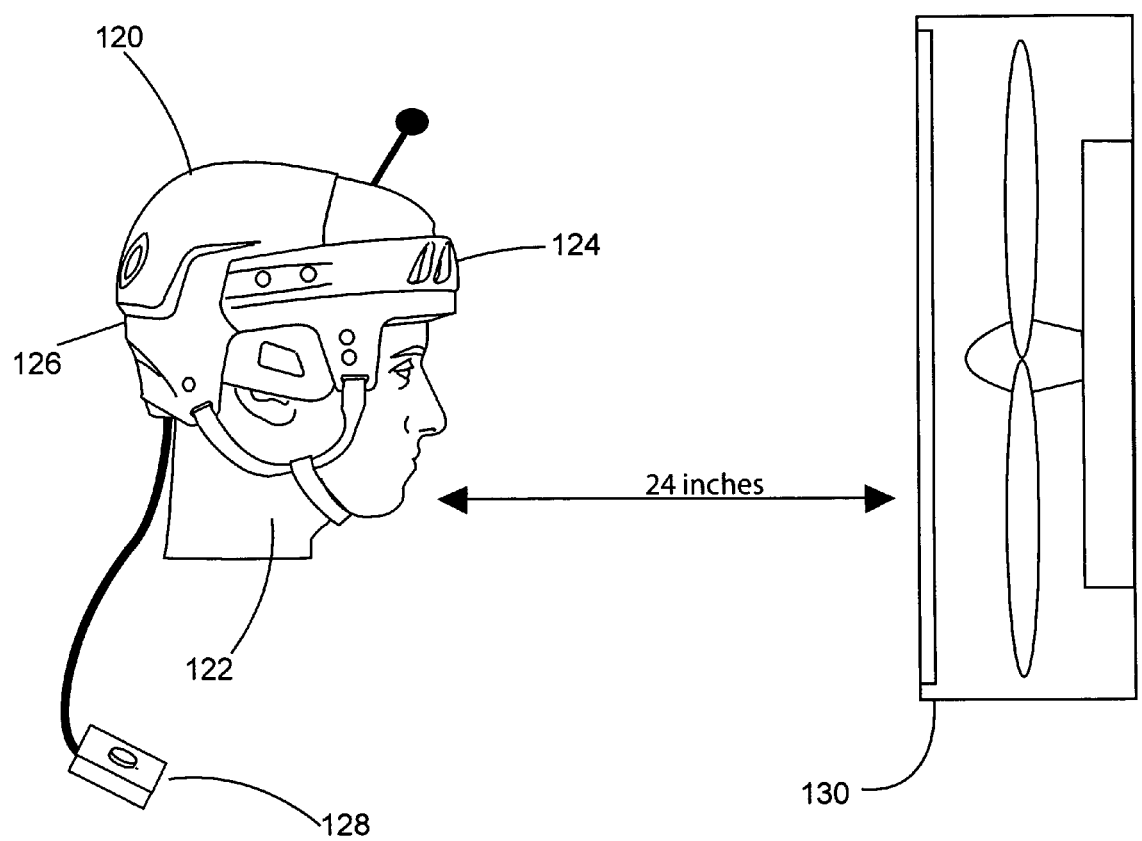
FIG. 8 illustrates how the cooling properties of one embodiment of the present invention was measured.
Figure 9:
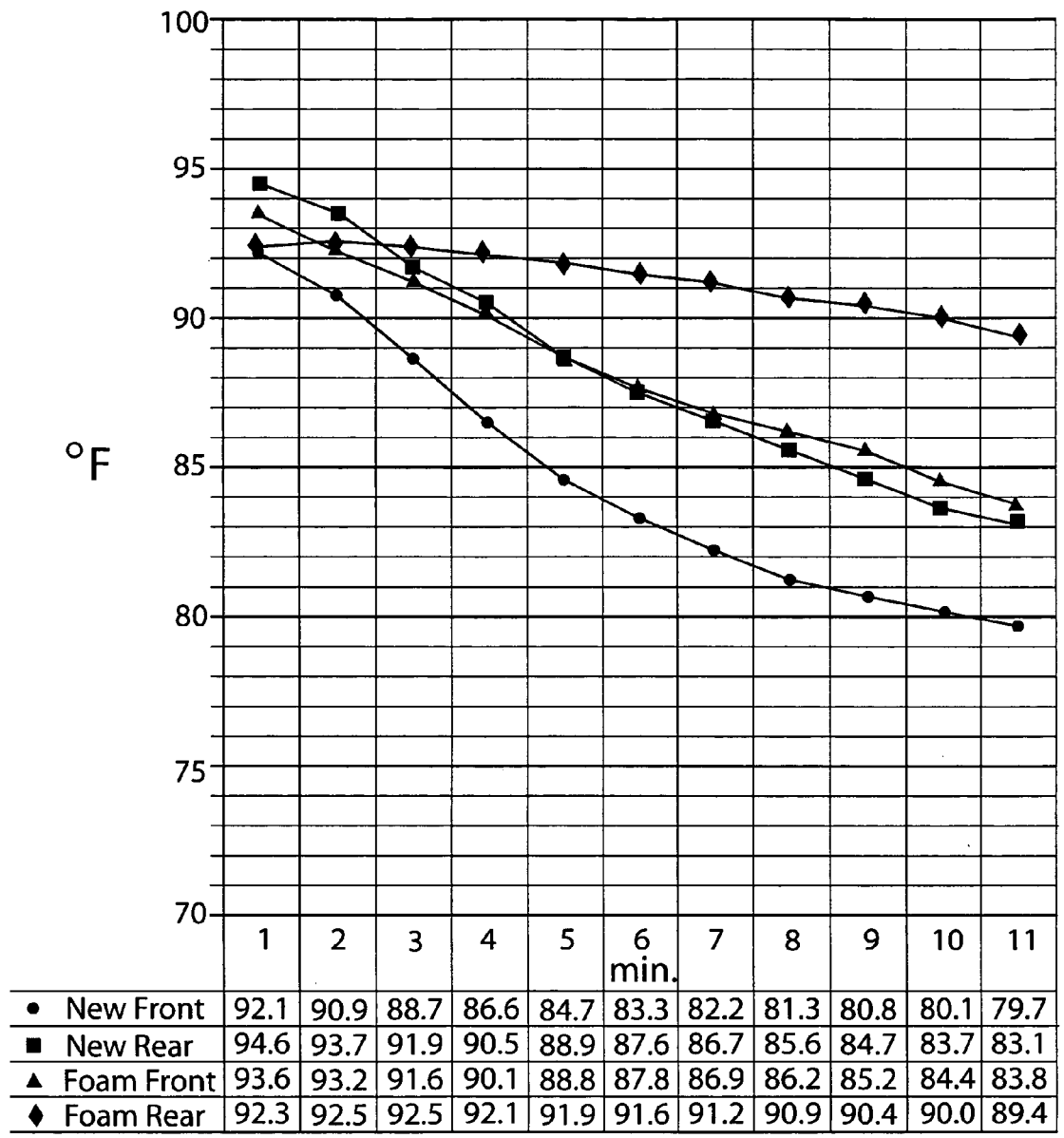
FIG. 9 illustrates the comparative results of the cooling test conducted on a hockey helmet.

The cooling properties of the preferred shock absorbing structure of the present invention were evaluated. As shown in FIG. 8, a standard hockey helmet 120 was modified by removing its standard foam liner and fitting helmet 120 with a layer of the preferred shock absorbing structure of the present invention. The helmet 120 was placed over a mannequin head 122 and thermocouples (not shown) were positioned at the front 124 and rear 126 of the helmet 120 to measure temperatures. A heating source 128 was turned on until the temperatures at the front 124 and rear 126 of the helmet 120 reached 92.1° F. After 3 minutes, a fan 130 located 24 inches away from the front 124 of the helmet 120 was turned on. Temperature readings from each thermocouple were taken at one-minute intervals for a period of 10 mins. The same procedure was repeated using a standard hockey helmet with its original foam liner. The results are plotted in FIG. 9. It will be noted that the temperature profile for the front 124 of the helmet 120 shows that using the shock absorbing structure of the present invention results in consistently lower temperatures than using the standard foam liner. Regarding the rear 126 of the helmet, FIG. 9 shows that the decrease in temperature for the standard foam liner is minimal after 10 minutes, whereas it is significantly more for the shock absorbing liner of the present invention. This shows that airflow within the helmet 120 is significantly increased when the helmet 120 is fitted with the shock absorber of the present invention.

Figure 10:
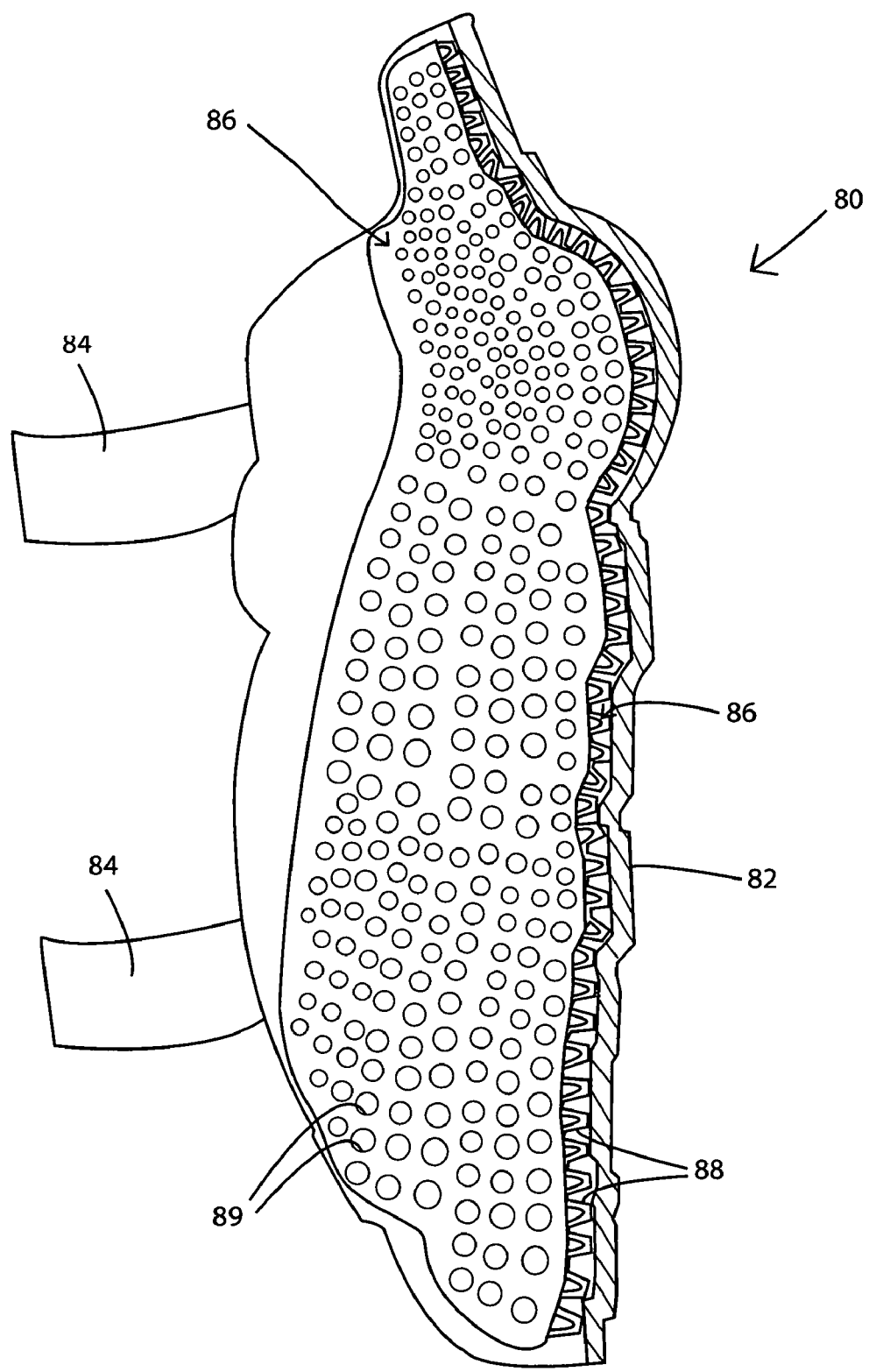
FIG. 10 is a side elevational view of a shin guard showing the use of a shock absorbing structure of the present invention.

As should be apparent from the above description, that the shock absorbing structure 10, and alternatively, shock absorbing structure 30 in accordance with the present invention, may be used in a variety of other protective environments. This may include other types of helmets, shin pads, knee pads, elbow pads, shoulder pads, chest protectors, gloves, pants and footwear. Although the use of the shocking absorbing structure of the present invention has been described hereinabove with respect to helmets, use of these shock absorbing structures in other protective gear is envisioned without departing from the spirit of the present invention. More particularly and referring to FIG. 10, a shin guard 80 is shown. Shin guard 80 includes a hard protective outer structure 82 which is retained onto a user's leg by way of straps 84. A shock absorbing structure 86 in accordance with the present invention is positioned behind protective surface 82. Shock absorbing structure 86 is substantially identical to one of the preferred first and second embodiments previously described herein and includes a plurality of frustoconical support members 88 as well as openings 89 for airflow therethrough.

In summary, the present invention is a product used to replace foams or other impact absorption devices currently used in various applications such as helmets (sports or otherwise), protective padding, etc. The shock absorbing structure of the present invention allows air to flow freely through it, thus assisting in keeping the wearer of the helmet or padding cooler. With its open structure, warm air can be dissipated through the structure and directed away from the body. The shock absorbing structure of the present invention can be manufactured at or less than the same weight, thickness and cost of existing shock absorbing structures made of expanded polystyrene (EPS).

The preferred embodiments of the present invention have been found to absorb more impact energy than EPS foam of the same thickness and weight, and unlike EPS foam, it allows air and moisture to flow freely through it. The preferred embodiments of the present invention dissipates heat, will not absorb moisture; and can be easily washed to remove odor and bacteria.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention is an example and the invention is not limited to the exact details shown or described.

The invention claimed is:

1. An accessory for providing protection to a part of the human body, the accessory comprising:
   a rigid outer protective shell defining an interior surface;
   a layer of a shock absorbing material secured to the interior surface of the protective shell;
   wherein the shock absorbing material comprises:
   a support surface made of a flexible material;
   a plurality of upstanding, hollow support members extending from the support surface, the support members made of flexible material; wherein each support member has an inner end adjacent the support surface and an outer end adjacent the shell and a sidewall extending between the inner and outer ends; and wherein each support member defines a first opening in the sidewall, and defines a second opening in the inner end and extending through the support surface; and defines a third opening in the outer end whereby air is able to flow through the first, second and third openings in each support member; and
   a flex airspace defined between each pair of adjacent support members, such that the adjacent support members are free standing; and wherein the support members flex into the flex airspace upon application of a force to the support member; and wherein the rigid outer protective shell defines openings that are aligned with the third openings in the outer ends of some of the support members; whereby the openings in the shell are in communication with the first, second and third openings in the support members.

2. The accessory of claim 1, wherein the support members have a shape that is generally frustoconical.

3. The accessory of claim 1, wherein at least others of the third openings in the support members do not align with the openings in the protective shell.

4. The accessory of claim 1, wherein the flexible plastic material is a thermoplastic polymer.

5. The accessory of claim 4, wherein the thermoplastic polymer is polyethylene.

6. The accessory of claim 1, wherein the support surface is generally planar and defines surface openings which allow air to flow into the hollow support members.

7. The accessory of claim 1, wherein the accessory is selected from the group consisting of helmets, shin pads, knee pads, elbow pads, shoulder pads, chest protectors, gloves, pants and footwear.

8. The accessory of claim 1, wherein an air passage is provided through each support member, and said air passage originates in an interior face of the support surface and terminates in both of the sidewall and the outer end of the support member remote from the support surface.

9. The accessory of claim 1, wherein the support surface is generally planar and the inner end of each support member is integral with an exterior face of the support surface; and the outer end of each support member is disposed a distance outwardly away from the exterior face and adjacent the shell; and wherein the outer ends of the support members are free of connections to each other.

10. The accessory of claim 1, wherein the inner end of each support member is larger than the outer end thereof, whereby the sidewall tapers from the inner end toward the outer end, and wherein the first opening in the sidewall is provided closer to the inner end of the support member than to the outer end thereof.

11. The accessory of claim 1, wherein the sidewall of each support member has a length from proximate its inner end to proximate its outer end; and wherein substantially the entire length of the sidewall is able to flex into the airspace.

* * * * *